United States Patent [19]
Horn et al.

[11] Patent Number: 6,060,531
[45] Date of Patent: May 9, 2000

[54] PRODUCTION OF LOW-FOGGING POLYURETHANE FOAMS, AND SPECIFIC POLYOXYALKYLENE-POLYOLS WHICH CAN BE USED FOR THIS PURPOSE

[75] Inventors: Peter Horn, Heidelberg; Ludwig Jung, Mammendorf; Harald Larbig, Ludwigshafen; Rolf Lebkücher, Mannheim; Gerhard Lehr, Schwegenheim, all of Germany

[73] Assignee: BASF Aktiengesellschaft, Ludwigshafen, Germany

[21] Appl. No.: 09/160,956

[22] Filed: Sep. 25, 1998

Related U.S. Application Data

[62] Division of application No. 08/852,211, May 6, 1997, abandoned, which is a division of application No. 08/565,208, Oct. 16, 1995, Pat. No. 5,672,636.

[51] Int. Cl.[7] .................................................. C08G 18/32
[52] U.S. Cl. .......................... 521/167; 521/163; 521/170; 521/174
[58] Field of Search ..................... 521/163, 170, 521/174, 167

[56] References Cited

U.S. PATENT DOCUMENTS

| | | | |
|---|---|---|---|
| 2,792,370 | 5/1957 | Dickson | 252/344 |
| 2,979,528 | 4/1961 | Lundsted | 564/505 |
| 3,779,927 | 12/1973 | Howell et al. | 252/75 |
| 3,803,063 | 4/1974 | Krentz, Jr. | |
| 3,841,888 | 10/1974 | Belde et al. | 106/173.01 |
| 4,230,824 | 10/1980 | Nodelman | |
| 4,261,704 | 4/1981 | Langdon | 44/425 |
| 4,414,032 | 11/1983 | Schrattenholz et al. | 106/190.1 |
| 4,436,891 | 3/1984 | Umeda et al. | 564/505 |
| 4,464,203 | 8/1984 | Belde et al. | 106/413 |
| 5,476,969 | 12/1995 | Hinz et al. | |
| 5,502,147 | 3/1996 | Nodelman et al. | 521/163 |

FOREIGN PATENT DOCUMENTS

| | | |
|---|---|---|
| 376602 | 7/1990 | European Pat. Off. |
| 539819 | 5/1993 | European Pat. Off. |

OTHER PUBLICATIONS

Chemical Abstracts, vol. 106, No. 8 (1987), Abstract No. 508406.

*Primary Examiner*—John M. Cooney, Jr.
*Attorney, Agent, or Firm*—Fernando A. Borrego

[57] ABSTRACT

The invention relates to a process for the production of polyurethane foams by reacting a) at least one organic polyisocyanate with b) at least one polyalkylene-polyol (b1) having a hydroxyl number of from 30 to 500, obtainable by alkoxylation of at least one initiator molecule from the group consisting of N,N'-bis(3-aminopropyl)ethylenediamine, tripropylenetetramine and tetrapropylenepentamine using at least one alkylene oxide, preferably ethylene oxide and/or 1,2-propylene oxide, or mixtures of the polyoxyalkylene polyols (b1) and other polyhydroxyl compounds having a functionality of from 2 to 8 and a hydroxyl number of from 15 to 500, and c) if desired, chain extenders and/or crosslinking agents, in the presence of d) blowing agents and, if desired, e) catalysts and f) additives, and to the novel polyoxyalkylene-polyols (b1) which can be used for this purpose.

7 Claims, No Drawings

PRODUCTION OF LOW-FOGGING POLYURETHANE FOAMS, AND SPECIFIC POLYOXYALKYLENE-POLYOLS WHICH CAN BE USED FOR THIS PURPOSE

This application is a division of application No. 08/852,211, filed May 6, 1997 which is now abandoned which is a divisional of application No. 08/565,208, filed Oct. 16, 1995 now U.S. Pat. No. 5,672,636.

The present invention relates to a process for the production of polyurethane foams, also abbreviated to PU foams below, preferably semirigid or rigid PU foams which have an improved foam structure, good aging properties and very good flow properties of the foamable reaction mixture and which are low-fogging, by reacting organic polyisocyanates (a) with polyhydroxyl compounds (b) and, if desired, chain extenders and/or crosslinking agents (c) in the presence of blowing agents (d) and, if desired, catalysts (e) and additives (f), where, according to the invention, the polyhydroxyl compounds (b) are polyoxyalkylene-polyols (b1) having a hydroxyl number of from 30 to 500 which are obtainable by polyaddition of at least one alkylene oxide, preferably ethylene oxide and/or 1,2-propylene oxide, onto at least one initiator molecule from the group consisting of N,N'-bis(3-aminopropyl)ethylenediamine, tripropylenetetramine and tetrapropylenepentamine, or industrially obtainable crude products thereof.

The present invention furthermore relates to the novel polyoxyalkylene-polyols (b1) containing tertiary amino groups as bridges which can be used in accordance with the invention.

The production of PU foams by reacting organic polyisocyanates with relatively high-molecular-weight polyhydroxyl compounds and, if desired, low-molecular weight chain extenders and/or crosslinking agents in the presence of catalysts and blowing agents and, if desired, additives and auxiliaries is known and is described in numerous patents and other publications. Reference may be made to the Kunststoff-Handbuch, Volume VII, Polyurethane, 1st Edition, 1966, edited by Dr. R. Vieweg and Dr. A. Höchtlen, Carl Hanser Verlag, Munich.

Also known is the production of semirigid PU foams by the prepolymer process, usually from tolylene diisocyanate (TDI) prepolymers, and of semirigid and rigid PU foams by the one-shot process, advantageously using mixtures of diphenylmethane diisocyanates (MDI) and polyphenylpolymethylene polyisocyanates, known as crude MDI, as polyisocyanates. A specific selection of relatively high-molecular-weight polyhydroxyl compounds and chain extenders and/or crosslinking agents and various amounts of polyisocyanates and water allow semirigid and rigid PU foams having various mechanical properties to be produced by this process. Furthermore, semirigid PU foams can be produced without using water by the frothing process with the addition of dichlorodifluoromethane as blowing agent. The polyhydroxyl compounds used here are a combination of branched, relatively high-molecular-weight polyoxyalkylene-polyols and amine-initiated chain extenders having hydroxyl numbers in the range from 450 to 500. The polyaddition reaction can be activated by means of organotin compounds (Kunststoff-Handbuch, Volume VII, Polyurethane, 2nd Edition, 1983, edited by D. G. Oertel, Carl Hanser Verlag, Munich, Vienna).

EP-A-0 490 145 describes composite elements comprising at least one outer layer of polyvinyl chloride or a polyvinyl chloride-containing polymer mixture and a PU foam, preferably a semirigid or rigid PU foam.

PU foams are expediently produced with addition of tertiary amines as catalysts, since these accelerate both the reaction between the hydroxyl groups of the polyhydroxyl compounds and the NCO groups of the polyisocyanates, the urethane formation and the reaction between water and NCO groups with formation of amino groups and carbon dioxide as blowing gas, the blowing reaction; in particular in the one-shot process, the rates of the reactions occurring alongside one another must be matched precisely to one another. Since crosslinking reactions with formation of allophanate, urea, biuret and cyanurate structures can also take place alongside the polyaddition and blowing reactions during foam formation, the catalysts employed must ensure that these various reactions take place synchronously. The catalysts must neither lose their catalytic activity due to premature incorporation into the polyurethane structure nor accelerate hydrolytic decomposition of the resultant PU foam.

A disadvantage of many of the tertiary amines used as catalysts in industry is their unpleasant odor, which is transferred to the PU foams produced and can adversely affect their use in certain applications. According to DE-A-23 21 884 (GB-A-1,344,038), PU foams are therefore produced using polyether-polyols prepared by means of a tertiary amine as catalyst in combination with an acid and a silicone oil.

Also known are highly reactive polyoxyalkylene-polyols containing bonded tertiary amino groups; according to EP-A-0 539 819, these are prepared by oxyalkylation of an initiator molecule containing at least two reactive hydrogen atoms and at least one tertiary amino group bonded via a spacer bridge comprising at least three methylene groups, by means of at least one alkylene oxide. The highly reactive polyoxyalkylene-polyols, which preferably have a functionality of 2 or 3 and a molecular weight of from 2800 to 6200 and are prepared using N,N-dimethyl-1,4-diaminobutane, N,N-dimethyl-1,3-diaminopropane and N,N-dimethyldipropylenetriamine as initiator molecules, are used for the production of compact or cellular, preferably flexible polyisocyanate polyaddition products. Polyoxyalkylene-polyols of this type have high catalytic activity in PU formulations for the production of flexible and semirigid PU foams.

It is an object of the present invention to ensure that the various reactions during the production of PU foams, preferably semirigid and rigid PU foams, occur synchronously while avoiding odor nuisance during the foaming process and due to the resultant foam. It is a further object to reduce the formation of voids in the foam and thus drastically to reduce the reject rate in the foam back of dashboards and other composite elements, for example those having top layers of polyvinyl chloride and other polyvinyl chloride-containing polymer mixtures. Through the improvement in the PU foam structure, the mechanical property level is to be increased and homogenized over the entire PU molding. A further aim is to improve the flow properties of the foamable reaction mixture and to extend the processing range with respect to foaming equipment and conditions, for example the temperature conditions. It should be possible to modify the mechanical properties of the PU foams by means of suitable additives which are compatible with PU formative components. The PU foams, preferably semirigid and rigid PU foams, should be very substantially fogging-free.

We have found that, surprisingly, this object is achieved by using selected polyoxyalkylene-polyols initiated by means of aliphatic polyamines as all or some of the polyhydroxyl compound.

The present invention accordingly provides a process for the production of PU foams, preferably semirigid or rigid PU foams, by reacting a) at least one organic or modified organic polyisocyanate or a mixture of an organic and a modified organic polyisoyante with b) at least one relatively high-molecular-weight polyhydroxyl compound containing at least two reactive hydrogen atoms, and c) if desired, low-molecular-weight chain extenders and/ or crosslinking agents, in the presence of d) blowing agents and, if desired, e) catalysts and f) additives, wherein the polyhydroxyl compound (b) is a polyoxyalkylene-polyol (b1) having a hydroxyl number of from 30 to 500, obtainable by alkoxylation of at least one initiator molecule from the group consisting of N,N'-bis(3-aminopropyl)ethylenediamine, tripropylenetetramine and tetrapropylenepentamine, or a mixture of at least two of said initiator molecules, using at least one alkylene oxide.

The present invention furthermore provides polyoxyalkylene-polyols having a hydroxyl number of from 30 to 500 obtainable by polyaddition of at least one alkylene oxide onto an initiator molecule from the group consisting of N,N'-bis(3-aminopropyl)-ethylenediamine, tripropylenetetramine and tetrapropylenepentamine and technical-grade mixtures thereof.

The polyoxyalkylene-polyols containing bonded tertiary amino groups which can be used in accordance with the invention are catalytically active and, in particular in combination with carboxylic acids, accelerate the polyaddition reaction of organic polyisocyanates with polyhydroxyl compounds. Their addition to PU reaction mixtures, even in extremely small amounts, can cause a significant shortening of the mold dwell time in the production of PU molded foams. This technical advantage, which also results in a reduction in production costs, is of considerable importance, in particular in the production of rigid PU foam moldings. The novel polyoxyalkylene-polyols are excellent solvents for certain blowing agents, for example (cyclo)alkanes, in particular cyclohexane, their addition enabling a considerable reduction in viscosity. In the case of rigid PU foams, their addition can reduce brittleness and, with the additional use of plasticizers for which they are solubilizers, allow the rigidity to be adjusted as desired, ie. according to technical requirements.

The PU foams, in particular semirigid PU foams, have excellent aging values and exhibit no exudation of volatile compounds.

Reaction mixtures for the production of PU foams have very good flow properties and, in contrast to, for example, ethylene-diamine-initiated polyoxyalkylene-polyols, do not have an adverse effect on the foaming times. In spite of a reduction in density, the mechanical properties of the odorless PU foams produced in accordance with the invention can be improved.

The low tendency toward formation of voids in the PU foams is advantageous and therefore noteworthy. In the foam backing of, for example, dashboards and other composite elements, for example those having top layers of polyvinyl chloride (PVC) or other PVC-containing polymer mixtures, thermoplastic polyurethane or acrylonitrile-styrene-acrylate rubber (ASA), the reject rate can thus be drastically reduced.

The following details apply to the novel process for the production of PU foams, preferably semirigid and rigid PU foams, and to the starting materials which can be used for this purpose:

a) Suitable isocyanates for the production of the PU foams, preferably semirigid and rigid PU foams, are the organic, for example aliphatic, cycloaliphatic and preferably aromatic, diisocyanates and/or polyisocyanates (a) known per se. Specific examples of aromatic polyisocyanates are: mixtures of 4,4'- and 2,4'-diphenylmethane diisocyanate (MDI), mixtures of MDI and polyphenyl-polymethylene polyisocyanates (crude MDI), expediently having a content of MDI isomers of at least 30% by weight, preferably from 40 to 90% by weight or more, based on the total weight of the mixture, 2,4- and 2,6-tolylene diisocyanate (TDI) and the corresponding commercially available isomer mixtures, mixtures of TDI and MDI and/or crude MDI.

Other suitable organic polyisocyanates (a) are modified organic polyisocyanates, ie. products obtained by chemical reaction of organic diisocyanates and/or polyisocyanates. Mention may be made by way of example of diisocyanates and/or polyisocyanates containing ester, urea, biuret, allophanate, isocyanurate and preferably carbodiimide, uretoneimine and/or urethane groups. Specific mention may be made of, for example: urethane group-containing prepolymers having an NCO content of from 14 to 2.8% by weight, preferably from 12 to 3.5% by weight, or quasiprepolymers having an NCO content of from 35 to 14% by weight, preferably from 34 to 22% by weight, where urethane group-modified polyisocyanates made from TDI have, in particular, an NCO content of from 34 to 28% by weight and those made from 4,4'-MDI, 4,4'- and 2,4'-MDI isomer mixtures or crude MDI have, in particular, an NCO content of from 28 to 22% by weight, based on the total weight, and are prepared by reacting diols, oxyalkylene glycols and/or polyoxyalkylene glycols having molecular weights of from 62 to 6000, preferably from 134 to 4200, with TDI, 4,4'-MDI, MDI isomer mixtures and/or crude MDI, for example at temperatures of from 20 to 110° C., preferably from 50 to 90° C., where, as oxyalkylene and polyoxyalkylene glycols, which may be employed individually or as mixtures, mention may be made by way of example of: diethylene glycol, dipropylene glycol, polyoxyethylene glycol, polyoxypropylene glycol and polyoxypropylene-polyoxyethylene glycol, and polyisocyanates containing carbodiimide groups and/or isocyanurate groups, for example based on MDI isomers and/or TDI.

However, particular success has been achieved by, and preference is therefore given to, mixtures of 4,4'- and 2,4'-MDI, crude MDI having an MDI content of at least 30% by weight, based on the total weight, mixtures of 4,4'- and 2,4'-MDI and mixtures of 2,4- and 2,6-TDI, mixtures of crude MDI and mixtures of 2,4- and 2,6-TDI, urethane group-containing polyisocyanate mixtures having an NCO content of from 28 to 14% by weight, based on the total weight, based on MDI and/or crude MDI.

The organic polyisocyanates which can be used according to the invention can be prepared by known processes, for example by reaction of the corresponding polyamines with phosgene to give carbamoyl chloride intermediates, followed by thermolysis thereof to give polyisocyanates, or by phosgene-free methods, for example by reaction of the corresponding polyamines with urea and/or carbamates and alcohols to give monomeric polyurethanes, followed by thermolysis thereof to give polyisocyanates and alcohols.

b) The relatively high-molecular-weight polyhydroxyl compounds (b) used according to the invention are polyoxyalkylene-polyols (b1) having a hydroxyl number of from 30 to 500, preferably from 200 to 450, in particular from 250 to 410, which are obtainable by alkoxylation of at least one initiator molecule from the group consisting of N,N'-bis(3-aminopropyl)-ethylenediamine, tripropylenetetramine and tetrapropylenepentamine, or a mixture of at least two of the said initiator molecules.

Said initiator molecules can be used in the form of chemically pure compounds having a functionality of from 6 to 8, as industrially obtainable compounds or in the form of an industrially obtainable mixture contaminated by other polyamines. The tripropylenetetramine employed is preferably industrially obtainable tripropylenetetramine mixtures containing polyamines of the formulae H$_2$N—Ch$_2$Ch$_2$Ch$_2$—NH—CH$_2$CH$_2$Ch$_2$—NH$_2$,

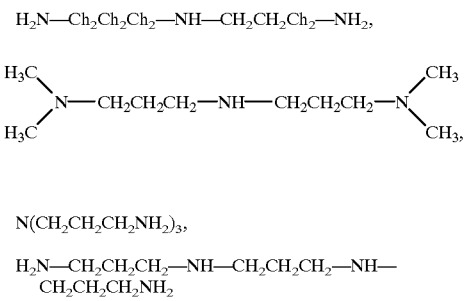

N(CH$_2$CH$_2$CH$_2$NH$_2$)$_3$,

H$_2$N—CH$_2$CH$_2$CH$_2$—NH—CH$_2$CH$_2$CH$_2$—NH—CH$_2$CH$_2$CH$_2$NH$_2$ and

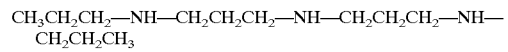

and the tetrapropylenepentamines employed are preferably industrially obtainable tetrapropylenepentamine mixtures containing

N(CH$_2$CH$_2$CH$_2$—NH$_2$)$_3$,

H$_2$N—(CH$_2$)$_3$—NH—(CH$_2$)$_3$—NH—(CH$_2$)$_3$—NH$_2$

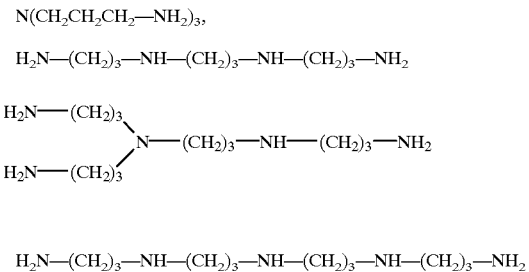

H$_2$N—(CH$_2$)$_3$—NH—(CH$_2$)$_3$—NH—(CH$_2$)$_3$—NH—(CH$_2$)$_3$—NH$_2$ and

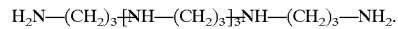

The polyoxyalkylene-polyols (b1) which can be used in accordance with the invention can be prepared by known processes, for example by anionic polymerization of one or more alkylene oxides having 2 to 4 carbon atoms in the presence of at least one of said initiator molecules, in the absence or preferably presence of a catalyst, for example an alkali metal hydroxide, such as sodium hydroxide or potassium hydroxide, or an alkali metal alkoxide, such as sodium methoxide, sodium ethoxide, potassium ethoxide or potassium isopropoxide. In a specific preparation variant, the alkoxylation can first be carried out in the absence of catalysts, and the basic catalysts can be introduced into the reaction mixture with increasing molecular weight of the novel polyoxyalkylene-polyols formed. Examples of suitable alkylene oxides are 1,2- and 2,3-butylene oxide, styrene oxide and preferably ethylene oxide and/or 1,2-propylene oxide. The alkylene oxides can be used here individually, or alternately one after the other or as a mixture.

For the production of the PU foams, preferably semirigid and rigid PU foams, the novel polyoxyalkylene-polyols (b1) can be used as the only relatively high-molecular-weight polyhydroxyl compound (b). However, in order to modify the mechanical properties of the PU foams or for technical reasons associated with processing, it may be expedient to use, as polyhydroxyl compounds (b), mixtures containing at least one novel polyoxyalkylene-polyol (b1) and at least one additional polyhydroxyl compound (b2) having a functionality of from 2 to 8, in particular from 2 to 3, for semirigid PU foams and from 3 to 6 for rigid PU foams, and having a hydroxyl number of from 15 to 500, preferably from 24 to 280, for semirigid PU foams and from 280 to 500 or more for rigid PU foams, with the exception of polyoxyalkylene-polyols as defined in (b1).

The mixtures of (b1) and (b2) preferred as polyhydroxyl compounds (b) have a hydroxyl number of from 30 to 500 and expediently contain, based on the total weight of (b1) and (b2), from 0.1 to 50% by weight, preferably from 0.5 to 30% by weight, in particular from 1 to 10% by weight, of (b1), and from 99.9 to 50% by weight, preferably from 99.5 to 70% by weight, in particular from 99 to 90% by weight, of (b2).

Relatively high-molecular-weight polyhydroxyl compounds (b2) which have proven successful are, for example, polyoxyalkylene-polyols other than (b1), polyester-polyols, advantageously those prepared from alkanedicarboxylic acids and polyhydric alcohols, polythioether-polyols, polyester-amides, hydroxyl-containing polyacetals, hydroxyl-containing, preferably aliphatic, polycarbonates or mixtures of at least two of said polyhydroxyl compounds. Preference is given to polyester-polyols and/or, in particular, polyoxyalkylene-polyols whose properties do not come under the definition of (b1).

Such polyoxyalkylene-polyols (b2) can be prepared by known processes, for example from one or more alkylene oxides having 2 to 4 carbon atoms in the alkylene radical by anionic polymerization using alkali metal hydroxides or alkoxides as catalysts and with addition of at least one initiator molecule containing from 2 to 8 reactive bonded hydrogen atoms, or by cationic polymerization using Lewis acids, such as antimony pentachloride, boron fluoride etherate inter alia, or bleaching earth as catalysts.

Examples of suitable alkylene oxides for this purpose are tetrahydrofuran, 1,3-propylene oxide, 1,2- and 2,3-butylene oxide, styrene oxide and preferably ethylene oxide and 1,2-propylene oxide. The alkaline oxides can be used individually, alternately one after the other or as mixtures. Examples of suitable initiator molecules are: water, organic dicarboxylic acids, such as succinic acid, adipic acid, phthalic acid and terephthalic acid, and preferably polyhydric, in particular dihydric to octahydric alcohols or dialkylene glycols, for example ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose. The polyoxyalkylene-polyols, preferably polyoxypropylene- and polyoxypropylene-polyoxyethylene-polyols, expediently have, for the production of semirigid PU foams, a functionality of, preferably, from 2 to 4, in particular from 2 to 3, and hydroxyl numbers of, preferably from 24 to 160, and suitable polyoxytetramethylene glycols usually have a hydroxyl number of from 37 to 160.

Polyhydroxyl compounds (b2) which have proven highly successful are, for example, polyoxyalkylene-polyols (b2) or mixtures thereof having a functionality of from 2 to 4, preferably 2 to 3, and a hydroxyl number of from 15 to 300, preferably from 15 to 280, in particular from 18 to 260, prepared by polyaddition of ethylene oxide, 1,2-propylene oxide or mixtures of ethylene oxide and 1,2-propylene oxide onto at least one initiator molecule of the formula

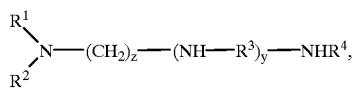

where
$R^1$ and $R^2$ are identical or different and are linear or branched $C_1$- to $C_4$-alkyl, the two radicals together are $C_4$- to C6-cycloalkylene, in which one methylene group may be replaced by an —O— or —$NR^5$— bridge, where $R^5$ is $C_1$- to $C_4$-alkyl, or are identical or different and are dialkylaminoalkyl of the formula

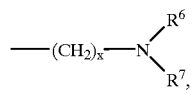

where $R^6$ and $R^7$ are identical or different and are linear or branched $C_1$- to $C_4$-alkyl, or the two radicals together are $C_4$- to $C_6$-cycloalkylene, in which one methylene group may be replaced by an —O— or —$NR^5$— bridge, and X is an integer having a value of at least 3, z is an integer having a value of at least 3, $R^3$ is a $C_2$- to $C_4$-alkylene, y is zero or a number from 1 to 3, and $R^4$ is hydrogen or $C_1$- to $C_4$-alkyl, with the proviso that y is zero if $R^4$ is hydrogen.

Preferred polyoxyalkylene-polyols (b2) having a functionality of from 2 to 3 and a hydroxyl number of from 15 to 300, in particular from 18 to 260, can be prepared, for example, by polyaddition of at least one alkylene oxide, preferably ethylene oxide, 1,2-propylene oxide or a mixture of ethylene oxide and 1,2-propylene oxide, onto an initiator molecule from the group consisting of N,N-dimethyl-1,3-diaminopropane, N,N-dimethyl-1,4-diaminobutane and in particular N,N-dimethyldipropylenetriamine. Highly reactive polyoxyalkylene-polyols (b2) of this type, in which the tertiary amino group is bonded to the —NH— and/or —$NH_2$ groups which react with alkylene oxide via a spacer bridge comprising at least 3 methylene radicals, are described in DE-A-41 35 588, the entire disclosure content of which is incorporated herein by way of reference. Other preferred polyhydroxyl compounds (b2) are block polyoxypropylene-polyoxyethylene-polyols (b2) or mixtures thereof having a hydroxyl number of from 15 to 65, preferably from 24 to 40, and a content of terminal ethylene oxide units of from 2 to 9% by weight, preferably from 3 to 8% by weight, in particular from 5 to 7% by weight, based on the weight of the polyoxypropylene units, which are prepared by anionic polymerization of 1,2-propylene oxide onto an initiator molecule mixture having a mean functionality of from 2.3 to 2.8, preferably from 2.3 to 2.7, in particular from 2.5 to 2.7, at elevated temperature, which comprises water and glycerol and/or trimethylolpropane, and polymerization of ethylene oxide onto the resultant polyoxypropylene adduct. Block polyoxypropylene-polyoxyethylene-polyols (b2) of said type have been disclosed in EP-A-433 878 and EP-A-433 889, the entire descriptions of which are incorporated herein by way of reference.

Other suitable polyhydroxyl compounds (b2) are polymer-modified polyoxyalkylene-polyols (b2), preferably graft polyoxyalkylene-polyols, in particular those based on styrene and/or acrylonitrile, which are prepared by in-situ polymerization of acrylonitrile, styrene or preferably mixtures of styrene and acrylonitrile, for example in a weight ratio of from 90:10 to 10:90, preferably from 70:30 to 30:70, expediently in the abovementioned polyoxyalkylene-polyols, as described in German Patents 11 11 934, 12 22 669 (U.S. Pat. Nos. 3,304,273, 3,383, 351, 3,523,093), 11 52 536 (GB 1,040,452) and 11 52 537 (GB 987,618), and polyoxyalkylene-polyol dispersions containing, as dispersant phase, usually in an amount of from 1 to 50% by weight, preferably from 2 to 25% by weight: for example polyureas, polyhydrazides, melamine and/or polyurethanes containing bonded tertiary amino groups, which are described, for example, in EP-B-011 752 (U.S. Pat. No. 4,304,708), U.S. Pat. No. 4,374,209 and DE-A-32 31 497.

The polyoxyalkylene-polyols (b2) can be used individually or in the form of mixtures.

Other polyhydroxyl compounds (b2) which can be used are polyester-polyols, which can be prepared, for example, from alkanedicarboxylic acids having 2 to 12 carbon atoms, preferably alkanedicarboxylic acids having 4 to 6 carbon atoms, or mixtures of alkanedicarboxylic acids and/or aromatic polycarboxylic acids and polyhydric alcohols, preferably diols, having 2 to 12 carbon atoms, preferably 2 to 6 carbon atoms, and/or alkylene glycols. Examples of suitable alkanedicarboxylic acids are: succinic acid, glutaric acid, adipic acid, suberic acid, azelaic acid, sebacic acid and decanedicarboxylic acid. Examples of suitable aromatic polycarboxylic acids are phthalic acid, isophthalic acid and terephthalic acid. The alkanedicarboxylic acids can be used individually or as a mixture with one another. Instead of the free dicarboxylic acids, it is also possible to use the corresponding dicarboxylic acid derivatives, for example dicarboxylic acid monoesters or diesters with alcohols having 1 to 4 carbon atoms or dicarboxylic anhydrides. Preference is given to dicarboxylic acid mixtures comprising succinic acid, glutaric acid and adipic acid, in mixing ratios of, for example, from to 35:35 to 50:20 to 32 parts by weight, in particular adipic acid. Examples of dihydric and polyhydric alcohols, in particular diols or alkylene glycols, are: ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol and mixtures of at least two of the said diols, in particular mixtures of 1,4-butanediol, 1,5-pentanediol and 1,6-hexanediol. It is also possible to employ polyester-polyols made from lactones, for example ε-caprolactone, or hydroxycarboxylic acids, for example ω-hydroxycaproic acid.

In order to prepare the polyester-polyols, the mixtures of aromatic and aliphatic dicarboxylic acids and preferably alkanedicarboxylic acids and/or derivatives thereof and polyhydric alcohols can be polycondensed in the absence or preferably in the presence of esterification catalysts, expediently in an atmosphere of inert gases, for example nitrogen, helium, argon inter alia, in the melt at temperatures of from 150 to 250° C., preferably from 180 to 220° C., if desired under reduced pressure, to the desired acid number, which is advantageously less than 10, but preferably less than 2. In a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers, for example benzene, toluene, xylene or chlorobenzene, for azeotropic removal of the water of condensation by distillation.

In order to prepare the polyester-polyols, the organic polycarboxylic acids and/or derivatives thereof and polyhydric alcohols are advantageously polycondensed in a molar ratio of from 1:1 to 1.8, preferably from 1:1.05 to 1.2.

The resultant polyester-polyols preferably have a functionality of from 2 to 4, in particular from 2 to 3, and a hydroxyl number of from 24 to 200, preferably from 32 to 140, in particular from 40 to 94.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerization of the cyclic acetals.

Examples of suitable hydroxyl-containing polycarbonates are those of the type known per se, which can be prepared, for example, by reacting diols, such as 1,3-propanediol, 1,4-butanediol and/or 1,6-hexanediol, diethylene glycol, triethylene glycol or tetraethylene glycol, with diaryl carbonates, for example diphenyl carbonates, or phosgene.

The polyester-amides include, for example, the predominantly linear condensates obtained from polybasic, saturated and/or unsaturated carboxylic acids or anhydrides thereof, and polyhydric, saturated and/or unsaturated aminoalcohols, or mixtures of polyhydric alcohols and aminoalcohols and/or polyamines.

c) The production of the PU foams by the novel process can also be carried out in the presence of low-molecular-weight, difunctional chain extenders, low-molecular-weight, trifunctional or polyfunctional, preferably trifunctional or tetrafunctional, crosslinking agents or mixtures of chain extenders and crosslinking agents, in addition to the relatively high-molecular-weight polyhydroxyl compounds (b).

Examples of suitable chain extenders and crosslinking agents (c) of this type are diols, such as (cyclo)alkanediols and dialkylene glycols, and/or polyhydric alcohols, preferably triols and tetraols, having molecular weights of less than 400, preferably from 60 to 300. Examples of suitable compounds are aliphatic, cycloaliphatic and/or araliphatic diols having 2 to 14 carbon atoms, preferably 4 to 10 carbon atoms, for example ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, and triols, such as 1,2,4- and 1,3,5-trihydroxycyclohexane, glycerol and trimethylolpropane. Other suitable chain extenders and crosslinking agents are low-molecular-weight, hydroxyl-containing polyalkylene oxides having molecular weights of up to 400 based on ethylene oxide and/or 1,2-propylene oxide and, as initiator molecules, the diols and/or triols mentioned by way of example.

If mixtures of relatively high-molecular-weight polyhydroxyl compounds (b) and chain extenders and/or crosslinking agents (c) are used, for example to modify the mechanical properties, for example the hardness, these expediently contain the chain extenders and/or crosslinking agents (c) in an amount of from 0.5 to 20% by weight, preferably from 10 to 15% by weight, based on the total weight, the alkali ion content of the mixture usually being less than 10 ppm, preferably less than 5 ppm, in particular less than 3 ppm.

Other suitable crosslinking agents (c) are those having a high content of alkali metal ions, preferably potassium ions, for example of from 150 to 1200 ppm, preferably from 150 to 800 ppm, in particular from 400 to 600 ppm.

d) The blowing agents (d) which can be used for the production of the PU foams, preferably semirigid and rigid PU foams, preferably include water, which reacts with isocyanate groups with formation of carbon dioxide. The amounts of water expediently employed are from 0.1 to 8 parts by weight, preferably from 1.5 to 5.0 parts by weight, in particular from 2.5 to 3.5 parts by weight, based on 100 parts by weight of the polyhydroxyl compounds (b) or the mixtures of relatively high-molecular-weight polyhydroxyl compounds (b) and chain extenders and/or crosslinking agents.

It is also possible to employ physical blowing agents, as a mixture with water or as the only blowing agent. Suitable compounds are liquids which are inert toward the organic, modified or unmodified polyisocyanate (a) and have boiling points of below 100° C., preferably below 50° C., in particular from −50 to 40° C., at atmospheric pressure, so that they evaporate under the effect of the exothermic polyaddition reaction. Examples of such preferred liquids are hydrocarbons, for example n- and isopentane, preferably technical-grade mixtures of n- and isopentane, n- and isobutane, n- and isopropane, cycloalkanes, for example cyclohexane and cyclopentane, ethers, for example furan, dimethyl ether and diethyl ether, ketones, for example acetone and methyl ethyl ketone, alkyl carbonates, for example methyl formate, dimethyl oxalate and ethyl acetate, and halogenated hydrocarbons, for example methylene chloride, dichloromonofluoromethane, difluoromethane, difluorochloromethane, trifluoromethane, trifluoroethane, tetrafluoroethane, heptafluoropropane, 1-chloro-2,2-difluoroethane (142), 1-chloro-1,1-difluoroethane (142b) and 1-chloro-1,2-difluoroethane (142a). It is also possible to use mixtures of these low-boiling liquids with one another, for example mixtures of difluorochloromethane and 142b, and/or with other substituted or unsubstituted hydrocarbons.

The requisite amount, or the requisite amount in addition to water, of physical blowing agents can be determined in a simple manner as a function of the desired foam density and is from about 0 to 25 parts by weight, preferably from 1 to 25 parts by weight, in particular from 2 to 15 parts by weight, per 100 parts by weight of the polyhydroxyl compounds (b). It may be expedient to mix the modified or unmodified polyisocyanates (a) with the inert, physical blowing agents and thus to reduce the viscosity.

e) The PU foams can be produced by the novel process in the absence of conventional amine catalysts. However, the reaction is expediently carried out in the presence of conventional catalysts (e), which greatly accelerate the reaction of the organic and/or modified organic polyisocyanates (a) with the polyhydroxyl compounds (b) and chain extenders and/or crosslinking agents (c). Examples of suitable catalysts are alkali metal salts of monocarboxylic acids containing linear or branched alkyl radicals having 1 to 20 carbon atoms, preferably 1 to 18 carbon atoms, and/or dicarboxylic acids containing linear or branched alkyl radicals having 2 to 20 carbon atoms, preferably 2 to 12 carbon atoms, for example potassium formate, potassium acetate, potassium octanoate, potassium maleate and dipotassium adipate, and organometallic compounds, preferably organotin compounds, for example tin(II) salts of organic carboxylic acids, for example tin(II) diacetate, tin(II) dioctanoate, tin(II) diethylhexanoate and tin(II) dilaurate, and the dialkyltin(IV) salts of organic carboxylic acids, for example dibutyltin diacetate, dibutyltin dilaurate, dibutyltin maleate and dioctyltin diacetate. Such catalysts are described, for example, in DE-A-3 048 529. Dialkyltin(IV) mercapto compounds for example bislauryltin(IV) dimercaptide, have also proven highly suitable.

The catalysts are usually used in an amount of from 0.001 to 0.2 part by weight, preferably from 0.005 to 0.015 part by weight, per 100 parts by weight of the formative components (a) to (c).

f) If desired, additives (e) can also be incorporated into the reaction mixture for the production of the PU foams, preferably semirigid and rigid PU foams. Examples which may be mentioned are acids, plasticizers, surfactants, foam stabilizers, cell regulators, fillers, antioxidants, dyes, pigments, flameproofing agents, antihydrolysis agents and fungistatic and bacteriostatic substances.

For the production of the PU foams by the novel process, inorganic acids, organic acids or mixtures of inorganic and organic acids can be used as preferred additive (f). Examples of inorganic acids which have proven successful are polyphosphoric acids, monobasic and polybasic phosphoric acids, preferably triphosphoric acid, and hydrochloric acid. Preference is given to organic acids, in particular those from the group consisting of monocarboxylic acids, polycarboxylic acids, preferably dicarboxylic acids, and aromatic sulfonic acids. Organic acids which may be mentioned by way of example are mono- and dicarboxylic acids, for example formic acid, acetic acid, propionic acid and preferably ricinoleic acid, hydroxystearic acids, oxalic acids, succinic acid, maleic acid, fumaric acid, tartaric acid, citric acid, adipic acid, benzoic acid, phthalic acid, terephthalic acid and isophthalic acid, and sulfonic acids, for example benzenesulfonic acid and p-toluenesulfonic acid. Depending on their $pK_a$ value and molecular weight and on the basicity of the polyhydroxyl compounds (b), the inorganic and/or organic acids are usually used in an amount of from 0.1 to 20 parts by weight, based on 100 parts by weight of polyhydroxyl compound (b), it being possible to determine the precise amounts by weight by simple preliminary experiments.

Organic acids which have proven particularly successful are long-chain fatty acids, for example ricinoleic acid and hydroxyfatty acids, for example hydroxystearic acids, which can be obtained from natural oils, and can be converted into hydroxyfatty acids by epoxidation of the unsaturated double bonds and adduction of monohydric and/or polyhydric alcohols onto the epoxide group. Hydroxyl-containing organic acids of this type have proven particularly successful in combination with crosslinking agents (c) having a high content of alkali metal ions, since this combination has an excellent emulsification action and gives the PU foams an extremely homogeneous foam structure. When a crosslinking agent (c) having an alkali metal ion content of less than 10 ppm is used in combination with the organic acids, the cream time of the reaction mixture is extended.

Other additives (f) which have proven successful are plasticizers, which, inter alia, improve the flow behavior of the reaction mixture. Suitable examples are plasticizers from the group consisting of dialkyl phthalates, for example those having 4 to 20 carbon atoms, preferably 9 to 11 carbon atoms, in the alkyl radical. These plasticizers are commercially available under the trade name Palatinol® from BASF Aktiengesellschaft. Other suitable plasticizers are phosphates, for example tricresyl phosphate, phenyl dicresyl phosphate, inter alia, which simultaneously improve the flame resistance of the PU foams.

Examples of suitable surfactants are compounds which serve to support homogenization of the starting materials and may also be suitable for regulating the cell structure. Examples which may be mentioned are emulsifiers, such as sodium salts of castor oil sulfates or of fatty acids, and salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers, such as siloxane-oxyalkylene co-polymers and other organopolysiloxanes, oxyethylated alkylphenols, oxyethylated fatty alcohols, paraffin oils, esters of castor oil and ricinoleic acid, turkey red oil and groundnut oil, and cell regulators, such as paraffins, fatty alcohols and dimethylpolysiloxanes. Furthermore, the emulsification action and cell structure can be improved and/or the foam can be stabilized using oligomeric polyacrylates containing polyoxyalkylene and fluoroalkane radicals as side groups. The surfactants are usually used in amounts of from 0.01 to 5 parts by weight, based on 100 parts by weight of polyhydroxyl compounds (b) and chain extenders and/or crosslinking agents (c).

For the purposes of the present invention, the term fillers, in particular reinforcing fillers, is taken to mean conventional organic and inorganic fillers and reinforcing materials known per se. Specific examples which may be mentioned are: inorganic fillers, such as silicate minerals, for example phyllosilicates, such as antigorite, serpentine, hornblends, amphibole, chrisotile, zeolites and talc; metal oxides, such as kaolin, aluminum oxides, aluminum silicate, titanium oxide and iron oxides, metal salts, such as chalk, barytes and inorganic pigments, such as cadmium sulfide and zinc sulfide, and glass particles. Examples of suitable organic fillers are: carbon black, melamine, collophony, cyclopentadienyl resins and graft polymers.

The inorganic and organic fillers can be used individually or as mixtures and are advantageously incorporated into the reaction mixture in amounts of from 0.5 to 50% by weight, preferably from 1 to 40% by weight, based on the weight of the components (a) to (c).

Examples of suitable flameproofing agents are tricresyl phosphate, tris(2-chloroethyl) phosphate, tris(2- chloropropyl) phosphate, tris(1,3-dichloropropyl) phosphate, tris(2,3-di-bromopropyl) phosphate and tetrakis(2-chloroethyl)ethylene diphosphate.

In addition to the abovementioned halogen-substituted phosphates, it is also possible to use inorganic flameproofing agents, such as red phosphorus, aluminum oxide hydrate, antimony trioxide, ammonium sulfate, ammonium polyphosphate and calcium sulfate, expandable graphite, urea or cyanuric acid derivatives, for example melamine or melamine cyanurate, or mixtures of at least two flameproofing agents, for example ammonium polyphosphates and melamine and, if desired, expandable graphite and/or starch for flameproofing the PU foams produced according to the invention. In general, it has proven expedient to use from 5 to 50 parts by weight, preferably from 5 to 25 parts by weight, of said flameproofing agents or mixtures per 100 parts by weight of components (a) to (c).

Examples of antioxidants which can be used are nonvolatile cryptophenols, for example the commercial products Irganox® 245 and Irganox® 1135 from Ciba-Geigy, or sterically hindered amines, for example the commercial product Naugard® 445 from Uniroyal.

Further details on the other conventional auxiliaries mentioned above are given in the specialist literature, for example the monograph by J. H. Saunders and K. C. Frisch, High Polymers, Volume XVI, Polyurethanes, parts 1 and 2, Interscience Publishers, 1962 and 1964 respectively, or the Kunststoff-Handbuch, Polyurethane, Volume VII, Carl-Hanser-Verlag, Munich, Vienna, 1st and 2nd Editions, 1966 and 1983 respectively.

In order to produce the PU foams, preferably semirigid and rigid PU foams, the organic, modified or unmodified polyisocyanates (a), the polyhydroxyl compounds (b) and, if used, chain extenders and/or crosslinking agents (c) are reacted in the presence of the blowing agents (d) and, if used, catalysts (e) and additives (f), usually at from 0 to 120° C., preferably at from 15 to 100° C., in particular at from 18 to 80° C., expediently in such amounts that advantageously from 0.5 to 2, preferably from 0.8 to 1.3, in particular approximately one, hydroxyl group(s) is bonded to (b) or (b) and (c) per NCO group. If water is used as one of the blowing agents or as the only blowing agent, it has proven expedient to use a ratio of, advantageously, from 0.5 to 5:1, preferably from 0.7 to 0.95:1, in particular from 0.75 to 0.85:1, equivalents of water to equivalents of NCO groups. For the production of PU foams containing isocyanurate groups, an NCO:OH group ratio of from 2 to 25:1, preferably from 2 to 10:1, in particular from 2 to 5:1, for example, has proven successful.

The PU foams, preferably the semirigid and rigid PU foams, are expediently produced by the one-shot process by mixing two components A and B, where formative components (b) and (d) and, if used, (c), (e) and (f), are usually combined to form component A, and the organic and/or modified organic polyisocyanates (a), if desired mixed with inert, physical blowing agents, are used as component B. Components A and B need only be mixed vigorously before production of the PU foams. The reaction mixture can be foamed and allowed to cure in open or closed molds. Furthermore, prefabricated covering materials can be foam-backed to give moldings.

The novel process is also particularly suitable for the production of PU molded foams. In this case, the reaction mixture, at from 15 to 80° C., preferably from 30 to 65° C., is introduced into an expediently metallic, thermostatable mold. The mold temperature is usually from 20 to 90° C., preferably from 35 to 70° C. The reaction mixture is usually allowed to cure without pressure or with compaction, for example at degrees of compaction of from 1.1 to 8, preferably from 2 to 6, in particular from 2.2 to 4, in the closed mold.

The PU foams produced by the novel process usually have densities of from 0.025 to 0.25 $g/cm^3$, preferably from 0.035 to 0.08 $g/cm^3$, it also being possible for molded foams, for example those having a cellular core and a compacted peripheral zone, to have densities of from 0.08 to 0.75 $g/cm^3$, preferably from 0.2 to 0.6 $g/cm^3$, depending on the degree of compaction used. The PU foams produced by the novel process are, as stated above, essentially odorless, have a uniform, essentially void-free cell structure and have a uniformly high mechanical property level.

The reaction mixtures for the production of the PU foams are used, for example, in the vehicle industry, for example in the automotive, aircraft and shipbuilding industries, and in the refrigeration and construction industries for foam-filling and foam-backing of cavities, for example dashboards and control panels, as interlayers for sandwich elements or for foam-filling refrigerator and freezer casings. The PU foams are suitable as insulation materials, for example as lagging for piping or heating systems. They are also used as wall linings, housing parts, cushioning materials, armrests, headrests, sun visors, parcel shelves, glove boxes, safety covers and central consoles.

EXAMPLES

Example 1

Component A: a mixture comprising 33.85 parts by weight of a block polyoxypropylene-polyoxyethylene-polyol having a hydroxyl number of 30 and a content of terminal ethylene oxide units of 5.9% by weight, based on the weight of the propylene oxide units, obtained by alkoxylation of an initiator molecule mixture comprising glycerol and water in a weight ratio of 1:0.98, 0.25 part by weight of a glycerol-initiated polyoxyethylene(62.5% by weight)-polyoxypropylene (27.5% by weight)-polyoxyethylene(10% by weight)-polyol having a hydroxyl number of 42, 35.00 parts by weight of a 1,2-propylene glycol-initiated polyoxypropylene(81.5% by weight)-polyoxyethylene (18.5% by weight) glycol having a hydroxyl number of 29, 6.00 parts by weight of an N,N'-bis(3-aminopropyl) ethylenediamine-initiated polyoxypropylene-polyol having a hydroxyl number of 393, 1.6 parts by weight of ricinoleic acid, 20.0 parts by weight of a di($C_9$- to $C_{11}$-alkyl) phthalate, 2.2 parts by weight of water, 0.45 part by weight of a 40% strength by weight potassium acetate solution in ethylene glycol, 0.40 part by weight of black paste and 1.0 part by weight of a sterically hindered amine as antioxidant (Naugard® 445).

Component B: A mixture of diphenylmethane diisocyanate isomers and polyphenyl-polymethylene polyisocyanates having an NCO content of 31.3% by weight and a diphenylmethane diisocyanate isomer content of 39% by weight, based on the total weight.

Foam backing of a dashboard for a motor vehicle:

This is carried out using a Hennecke foaming apparatus fitted with an MQ mixing head with throttle setting 5, nozzles having a diameter of 1.3 mm for component A and of 0.8 mm for component B, and an output capacity of 223 g/sec. The shot time was 4.2 to 5.05 seconds, corresponding to an output of 920 to 1126 g.

For foam-backing of the dashboards, the PVC/ABS cover film was placed in a metallic mold thermostated at from 40 to 43° C., the mold was closed, components A and B were mixed in a weight ratio of 100:43 at 30° C. at 200 bar, and the reaction mixture was injected into the closed mold, where it was allowed to expand.

The resultant dashboard was demolded after 3.5 minutes and then stored at 80° C. for 1 hour. There was no evidence of any sink marks. After 24 hours, the molding exhibited excellent adhesion between the semirigid PU foam and the PVC/ABS film.

30 void-free dashboards were produced without problems by the procedure described. The series experiment was then terminated.

The reaction mixture had a setting time of 70 seconds and a rise time of 105 seconds. The PU foam had a free-foamed density of 76 g/l.

Example 2

Component A: a mixture comprising 47.50 parts by weight of a block polyoxypropylene-polyoxyethylene-polyol having a hydroxyl number of 30 and a content of terminal ethylene oxide units of 5.9% by weight, based on the weight of the propylene oxide units, obtained by alkoxylation of an initiator molecule mixture comprising glycerol and water in a weight ratio of 1:0.98, 1.50 parts by weight of a glycerol-initiated polyoxyethylene(62.5% by weight)-polyoxypropylene(27.5% by weight)-polyoxyethylene(10% by weight)-polyol having a hydroxyl number of 42, 42.3 parts by weight of a glycerol-initiated polyoxypropylene(86% by weight)-polyoxyethylene(14% by weight)-polyol having a hydroxyl number of 28, 1.00 parts by weight of a polyoxypropylene-polyol having a hydroxyl number of 394 initiated by means of technical grade tripropylenetetramine, 5.00 parts by weight of an N,N-dimethyl-1,3-diaminopropane-initiated polyoxypropylene-polyol having a hydroxyl number of 250, 0.5 part by weight of ricinoleic acid, 2.2 parts by weight of water and 1.0 part by weight of a sterically hindered amine as antioxidant (Naugard® 445).

Component B: as in Example 1.

The molding was produced by a method similar to that of Example 1, but components A and B were mixed in a weight ratio of 100:41.66.

The molding, demolded after 3 minutes, exhibited no sink marks or voids.

The reaction mixture had a setting time of 78 seconds and a rise time of 108 seconds. The PU foam had a free-foamed density of 66 g/l.

Example 3

Component A: a mixture comprising 42.6 parts by weight of a block polyoxypropylene-polyoxyethylene-polyol having a hydroxyl number of 30 and a content of terminal ethylene oxide units of 5.9% by weight, based on the weight of the propylene oxide units, obtained by alkoxylation of an initiator molecule mixture comprising glycerol and water in a weight ratio of 1:0.98, 43.95 parts by weight of an N,N-dimethyldipropylenetriamine-initiated polyoxypropylene(86.5% by weight)-polyoxyethylene(13.5% by weight)-polyol having a hydroxyl number of 35, 3.3 parts by weight of a graft polyether-polyol having a hydroxyl number of 28, prepared by free-radical, in-situ polymerization of a glycerol-initiated polyoxypropylene-polyoxyethylene-polyol as graft base and a mixture of styrene and acrylonitrile in a weight ratio of 3:2 for formation of the graft (Lupranol® 4100 from BASF Aktiengesellschaft), 4.0 parts by weight of a glycerol-initiated polyoxyethylene-polyol having a hydroxyl number of 525 and a potassium ion content of 470 ppm, 2.0 parts by weight of a polyoxypropylene-polyol having a hydroxyl number of 386 initiated by means of technical grade tetrapropylenepentamine, 1.6 parts by weight of ricinoleic acid, 2.0 parts by weight of water, 0.15 part by weight of black paste and 1.0 part by weight of a sterically hindered amine as antioxidant (Naugard® 445).

Component B: as in Example 1.

The dashboard was produced by a method similar to that of Example 1, but components A and B were mixed in a weight ratio of 100:45.

The dashboard, demolded after 2.5 minutes, exhibited no sink marks or voids in the semirigid PU foam.

The reaction mixture had a setting time of 77 seconds and a rise time of 115 seconds. The PU foam had a free-foamed density of 79 g/l.

Example 4

Component A: As in Example 2, but the 1 part by weight of polyoxypropylene-polyol initiated by means of technical grade tripropylene tetramine was replaced by 1 part by weight of an N,N'-bis(3-aminopropyl) ethylenediamine-initiated polyoxypropylene-polyol having a hydroxyl number of 352.

Component B: as in Example 1.

The molding was produced by a method similar to that of Example 1, but components A and B were mixed in a weight ratio of 100:44.

The molding, demolded after 3 minutes, exhibited no sink marks or voids in the PU foam.

The reaction mixture had a setting time of 76 seconds and a rise time of 110 seconds. The PU foam had a free-foamed density of 76 g/l. The fogging value, measured in accordance with DIN 75 201, Method B, was 0.03 mg.

Comparative Example

Production of Semirigid PU Foams

Component A: a mixture comprising 82.4 parts by weight of a polyoxypropylene-polyol having a hydroxyl number of 400, prepared using an initiator molecule mixture comprising sucrose and water, 3.6 parts by weight of water, 10.9 parts by weight of cyclopentane, 2.3 parts by weight of dimethylaminocyclohexylamine and 0.8 part by weight of a silicone-based foam stabilizer (Tegostab® 8409 from Goldschmidt AG).

Component B: as in Example 1.

In order to produce a molding, components A and B were mixed in a weight ratio of 100:147.14, and the reaction mixture was transferred into a metallic mold and allowed to expand and cure.

The rigid PU foam molding, demolded after 3 minutes, was brittle and unsuitable for industrial use.

The reaction mixture had a cream time of 14 seconds, a setting time of 54 seconds and a rise time of 72 seconds. The PU foam had a free-foamed density of 25.4 g/l.

Example 5

Component A: a mixture comprising 84.7 parts by weight of an N,N'-bis(3-aminopropyl)ethylenediamine-initiated polyoxypropylene-polyol having a hydroxyl number of 407, 3.6 parts by weight of water, 10.9 parts by weight of cyclopentane and 0.8 part by weight of a silicone-based foam stabilizer (Tegostab® 8409 from Goldschmidt AG).

Component B: as in Example 1.

The molding was produced by a method similar to that of the Comparative Example, but components A and B were mixed in a weight ratio of 100:151.16.

The non-brittle rigid PU foam of the industrially suitable molding, which was demolded after 3 minutes, was extremely fine-celled.

The reaction mixture had a cream time of 8 seconds, a setting time of 23 seconds and a rise time of 37 seconds. The PU foam had a free-foamed density of 25.8 g/l.

We claim:

1. A rigid or semi-rigid polyurethane foam comprising the reaction product of
    a) at least one organic polyisocyanate with
    b) at least one relatively high-molecular-weight polyhydroxyl compound containing at least two reactive hydrogen atoms and
    c) optionally, low-molecular-weight chain extenders and/or crosslinking agents,
in the presence of
    d) a blowing agent, wherein the polyhydroxyl compound (b) comprises a polyoxyalkylene-polyol (b1) having a hydroxyl number of from 30 to 500, obtained from alkoxylation of N,N'-bis(3-aminopropyl)ethylene-diamine.

2. The foam of claim 1, wherein the alkylene oxide is selected from the group consisting of ethylene oxide; 1,2-propylene oxide; ethylene oxide and 1,2-propylene oxide.

3. The foam of claim 1, wherein the polyhydroxyl compound comprises a mixture comprising b1) at least one polyoxyalkylene-polyol having a hydroxyl number of from 30 to 500, obtained from alkoxylation of N,N'-bis(3-aminopropyl)ethylenediamine and b2) at least one polyhydroxyl compound having a functionality of from 2 to 8 and a hydroxyl number of from 15 to 500, other than the polyoxyalkylene-polyols as defined in (b1).

4. The foam of claim 1, wherein the polyhydroxyl compound comprises a mixture comprising, based on the total weight of (b1) and (b2), b1) from 0.1 to 50 percent by weight of at least one polyoxyalkylene-polyol having a hydroxyl number of from 30 to 500, obtained from alkoxylation of N,N'-bis(3-propropyl)-ethylenediamine and b2) from 99.9 to 50 percent by weight of at least one polyhydroxyl compound having a functionality of from 2 to 8 and a hydroxyl number of from 15 to 500, other than the polyoxyalkylene-polyols as defined in (b1).

5. The foam of claim 1, wherein the blowing agent is water.

6. The foam of claim 1, wherein the polyurethane foams are produced in the presence of
    e) catalysts and
    f) additives.

7. The foam of claim 1, wherein the polyurethane foams are produced in the presence of an additive selected from the group consisting of ricinoleic acid, hydroxyfatty acids and dialkyle phthalates having 4 to 20 carbon atoms in the alkyl radical.

* * * * *